(12) United States Patent
Wroblewski

(10) Patent No.: US 11,121,518 B1
(45) Date of Patent: Sep. 14, 2021

(54) SYSTEMS AND METHODS FOR LASER BEAM EXPANDER ALIGNMENT AND STABILIZATION

(71) Applicant: United States of America as represented by the Administrator of NASA, Washington, DC (US)

(72) Inventor: Adam C. Wroblewski, North Olmsted, OH (US)

(73) Assignee: United States of America as Represented by the Administrator of National Aeronautics and Space Administration, Washington, DC (US)

( * ) Notice: Subject to any disclaimer, the term of this patent is extended or adjusted under 35 U.S.C. 154(b) by 237 days.

(21) Appl. No.: 15/999,560

(22) Filed: Aug. 20, 2018

Related U.S. Application Data

(60) Provisional application No. 62/547,194, filed on Aug. 18, 2017.

(51) Int. Cl.
*H01S 3/00* (2006.01)
*G02B 27/28* (2006.01)
*G02B 7/00* (2021.01)

(52) U.S. Cl.
CPC ............ *H01S 3/0071* (2013.01); *G02B 7/003* (2013.01); *G02B 27/283* (2013.01)

(58) Field of Classification Search
None
See application file for complete search history.

(56) References Cited

U.S. PATENT DOCUMENTS

| | | | |
|---|---|---|---|
| 5,282,016 A * | 1/1994 | Shen | G02B 27/62 250/206.1 |
| 6,278,100 B1 * | 8/2001 | Friedman | G01C 11/00 250/201.9 |
| 6,547,406 B1 * | 4/2003 | Greenaway | G02B 15/00 348/E5.09 |
| 6,748,177 B1 * | 6/2004 | Upton | H01L 41/0953 310/311 |
| 6,925,260 B1 * | 8/2005 | Upton | G02B 7/183 398/118 |
| 7,064,817 B1 * | 6/2006 | Schmitt | G01S 7/4972 356/139.01 |
| 10,228,323 B1 * | 3/2019 | Hart | G01N 21/1702 |
| 10,673,146 B1 * | 6/2020 | Wroblewski | H01Q 19/19 |

(Continued)

*Primary Examiner* — Jennifer D. Carruth
(74) *Attorney, Agent, or Firm* — Robert H. Earp, III; Mark Wolfgang; Helen M. Galus

(57) ABSTRACT

An optical transmitter includes a beam steering system configured to direct an optical beam through a first optical element towards a second optical element. The beam steering system includes an adjustable optical element. The second optical element is susceptible to thermal and vibrational loads that disrupt an alignment between the first and second optical elements. The second optical element includes a main portion configured to direct the optical beam down a propagation path including a communications target. The second optical element also includes a reflective portion configured to direct an alignment portion of the optical beam back to the beam steering system through the first optical element. A detector is configured to receive the alignment portion and generate an alignment signal. A controller is configured to adjust the adjustable optical element based on the alignment signal to counteract the loads.

16 Claims, 6 Drawing Sheets

(56) References Cited

U.S. PATENT DOCUMENTS

| | | | | |
|---|---|---|---|---|
| 2009/0154874 A1* | 6/2009 | McLaughlin | ...... | G02B 6/29313 385/22 |
| 2010/0123951 A1* | 5/2010 | Shaw | ...... | G02B 23/06 359/399 |
| 2011/0176205 A1* | 7/2011 | Shaw | ...... | G02B 23/06 359/365 |
| 2012/0024374 A1* | 2/2012 | Knox | ...... | H01L 31/0543 136/259 |
| 2012/0292482 A1* | 11/2012 | Cook | ...... | G01S 17/42 250/206.1 |
| 2015/0015941 A1* | 1/2015 | Wilcken | ...... | G02B 3/00 359/365 |
| 2016/0352022 A1* | 12/2016 | Thomson | ...... | H01Q 1/288 |
| 2017/0052334 A1* | 2/2017 | Graves | ...... | G02B 6/4206 |
| 2019/0015930 A1* | 1/2019 | Berg | ...... | H01S 3/005 |
| 2020/0218055 A1* | 7/2020 | Tran | ...... | G02B 13/14 |

\* cited by examiner

SYSTEMS AND METHODS FOR LASER BEAM EXPANDER ALIGNMENT AND STABILIZATION

CROSS REFERENCE TO RELATED APPLICATION

This application claims benefit of U.S. Provisional Patent Application Ser. No. 62/547,194 filed on Aug. 18, 2017. The subject matter of this earlier-filed application is hereby incorporated by reference in its entirety.

ORIGIN OF DISCLOSURE

The present disclosure is based on work performed by an employee of the United States Government and may be manufactured and used by or for the Government for Government purposes without the payment of any royalties thereon or therefore.

TECHNICAL FIELD

The present disclosure relates to systems and methods of aligning and stabilizing laser beam expanders. More particularly, the present disclosure relates to a closed-loop feedback scheme that utilizes back reflections of an optical beam to actively mitigate disturbances (e.g., thermal and vibrational disturbances) in a laser beam expander's alignment.

BACKGROUND

Optical communications systems are superior to radio frequency ("RF") systems in many respects. For example, optical systems are generally higher bandwidth than their RF counterparts, which enables them to efficiently transmit higher quantities of data at higher rates. Optical systems are also more efficient, and could reduce power requirements by over 50% over RF systems. Optical systems are also potentially smaller and more lightweight than RF systems. Given these benefits, the effective implementation of optical communication systems has the potential to revolutionize the communications industry and other fields such as space exploration.

Optical communication systems are employed in environments (e.g., on an aircraft, in orbit, etc.) that present various difficulties for effective communication. For example, thermal and vibrational loads imposed on components in a vehicle-mounted system can continuously misalign those components, leading to poor laser beam quality and laser pointing error resulting in low signal strength at the receiver. A scheme for effective mitigation of these problems is necessary for enhanced communications capability.

SUMMARY

One embodiment relates to an optical transmitter. The optical transmitter includes a beam steering system configured to direct an optical beam through a first optical element towards a second optical element. The beam steering system includes an adjustable optical element. The second optical element is susceptible to thermal and vibrational loads that disrupt an alignment between the first and second optical elements. The second optical element includes a main portion configured to direct the optical beam down a propagation path including a communications target. The second optical element also includes a reflective portion configured to direct an alignment portion of the optical beam back to the beam steering system through the first optical element. A detector is configured to receive the alignment portion and generate an alignment signal. A controller is configured to adjust the adjustable optical element based on the alignment signal to counteract the loads.

Another embodiment is directed to an apparatus. The apparatus includes an optical source configured to generate an optical beam that propagates down an optical axis. The apparatus also includes a beam steering system configured to guide the optical beam to a beam expander disposed on the optical axis. The beam expander is configured to collimate the optical beam and project the optical beam towards a target. The beam expander includes a first optical element and a second optical element disposed further from the optical source than the first optical element such that the beam steering system is configured to guide the optical beam through the first optical element towards the second optical element. The second optical element includes a reflecting portion configured to direct an alignment portion of the optical beam back through the first optical element to the beam steering system. The apparatus also includes a detector configured to receive the alignment portion and generate an alignment signal. The apparatus also includes a controller configured to manipulate an orientation of a first component of the beam steering system based on the alignment signal to counteract thermal and vibrational disturbances on the second optical element.

Another embodiment is directed to a method. The method includes guiding, via a beam steering system, an optical beam through a first optical element of a beam expander towards a second optical element of the beam expander. The method also includes modifying, via the second optical element, a propagation path of the optical beam. The method also includes reflecting, via a reflecting portion of the second optical element, an alignment portion of the optical beam back through the first optical element. The method also includes guiding, via the beam steering system, the alignment portion to a detector to generate an alignment signal. The method also includes controlling, via a controller communicably coupled to the detector, an adjustable element of the beam steering system based on the alignment signal.

BRIEF DESCRIPTION OF THE DRAWINGS

In order that the advantages of certain embodiments will be readily understood, a more particular description of the disclosure briefly described above will be rendered by reference to example embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which.

DETAILED DESCRIPTION

Figure 1:
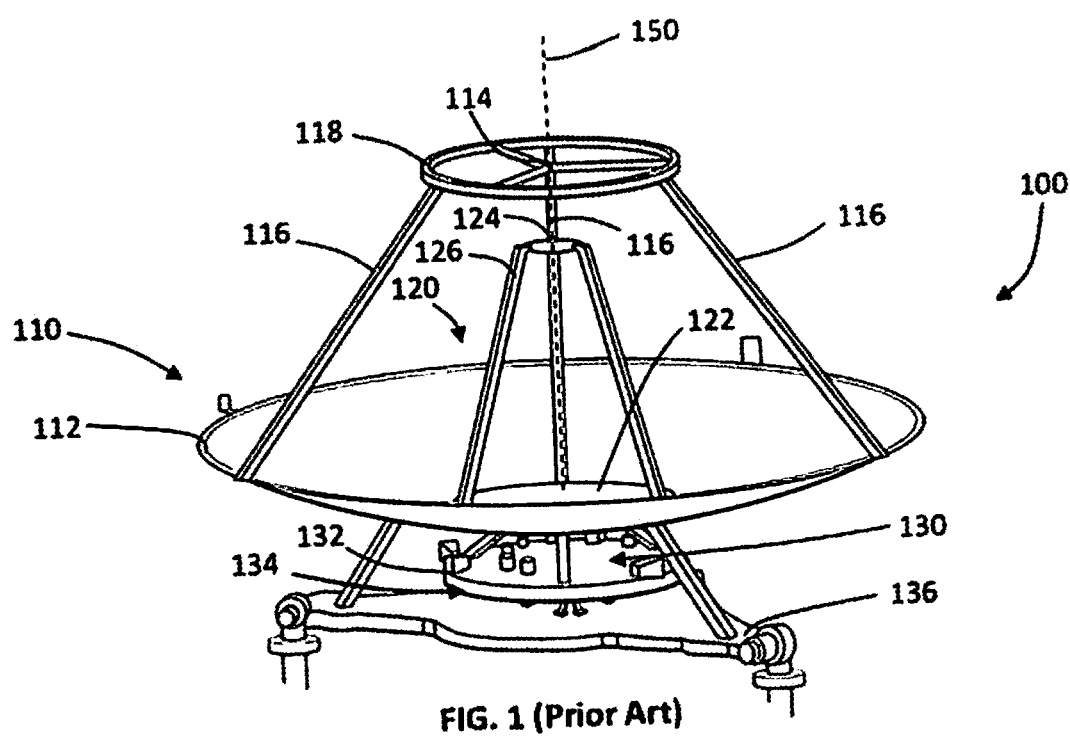
FIG. 1 is a perspective view of a prior art hybrid communications system including an optical beam expander, according to an example embodiment.

Referring generally to the Figures, described herein are systems, methods, and apparatuses configured to actively manage the alignment of a laser beam expander in real time. One implementation relates to an optical communications system. In various embodiments, the optical communications system includes a beam expander (e.g., a modified Ritchey-Chrétien telescope or Casegrain telescope) configured to direct an optical beam towards a desired communications target (e.g., a receiver associated with an intended recipient). The beam expander may include an optical element (e.g., a secondary mirror) disposed in spaced relation to an optical source. The optical element may be exposed to various thermal and vibrational loads generated in the environment of the communications system. These loads, if unmitigated, may cause misalignment of the optical element and deviations of the optical beam from the communications target.

In various embodiments, the communications system described herein includes a beam steering system configured to direct the optical beam down a propagation path and a partial reflector is disposed along the propagation path. The partial reflector is configured to reflect an alignment portion of the optical beam towards an alignment detector. In various embodiments, the partial reflector is integral with or attached to the optical element. For example, in certain implementations, the partial reflector comprises at least one portion of a secondary reflector of the laser beam expander. The portion may be flattened and disposed on a circumferential edge of the secondary reflector. Disturbances to the secondary reflector may cause some of the optical beam to reflect off of the portion to the beam steering system and a detection branch configured to determine a relative location of the reflected signal. In some embodiments, based on the relative location of the reflected portion, the beam steering system is adjusted to counteract the disturbances in the secondary mirror. This way, the propagation path converges with the desired communications target irrespective of low or high frequency environmental disturbances that may act on the optical element.

Examples are described in greater detail herein wherein a secondary optical element has reflective flats machined therein to provide reference surfaces for back-reflecting alignment portions of an optical beam. It should be appreciated that such flats may be machined into primary optical reflectors and achieve comparable results. Accordingly, the systems and methods described herein are not limited to machining reflecting portions into the optical element most distant from an optical source in a beam expander.

The alignment management methods described herein are implementable in a variety of circumstances. Any circumstance requiring precise alignment of a beam expander (e.g., an optical communications satellite) may utilize the systems and methods described herein. While example embodiments described with respect to the Figures generally involve a beam expander having a reflective geometry, the alignment management scheme described herein is also applicable to transmissive expander arrangements. For example, a transmissive laser beam expander may include a telescopic optical system including a number of optical components disposed along an optical axis thereof. Among these optical components may include a primary lens and a secondary lens. The primary lens may be disposed nearest the optical source. In other words, the primary lens may lie between the optical source and the secondary lens (which may be the furthest optical element from the optical source in the beam expander). The secondary lens may include reflective flat portions configured to direct an alignment portion(s) of the optical beam back through the primary lens to a beam steering system and an alignment detector. In one embodiment, the secondary lens may include reflective flat portions extending from a circumferential edge of a transmissive portion of the lens (similar to the secondary reflector 234 described with respect to FIGS. 2A-2C herein). In another embodiment, the secondary lens may have reflective flat portions within the transmissive portion thereof, and the reflective flat portions may include reflective layers deposited on flat areas of transmissive material. The present disclosure is applicable to any system including an optical element exposed to a different set of loads (e.g., thermal, vibrational, etc.) than the remainder of the system.

An example implementation of the systems and methods disclosed herein is in a hybrid communications system where an optical transmitter is co-axially disposed within a radio frequency ("RF") system. Referring now to FIG. 1, a prior art hybrid communication system 100 is shown, according to an example embodiment. As shown, the hybrid communications system 100 includes a RF subsystem 110 and an optical transmitter 120 that are co-bore sighted and share the same aperture. As shown, the hybrid communications system 100 is disposed on a communications deck 136. In various embodiments, the communications deck 136 is securely attached to an outer space vehicle (e.g., a satellite, an exploration vehicle, etc.).

As shown, the RF subsystem 110 includes a RF reflector 112 and a RF feed 114 having a central axis 150. RF feed 114 is configured to transmit radio waves radially outward therefrom such that at least a portion of the radio waves are reflected by the RF reflector 112 in a desired direction (e.g., towards a communication recipient on Earth). The RF feed 114 is suspended via struts 116 and a supporting ring 118 at a first location on the central axis 150. In certain embodiments, a phase center of the RF feed 114 is placed at a virtual focus of the RF reflector 112. One of the struts 116 may also serve as a waveguide to couple an amplifier to the RF feed 114 to generate the radio waves.

The optical transmitter 120 includes a primary optical reflector 122 and a secondary optical reflector 124. In various embodiments, the RF reflector 112 includes an opening that is centered about the central axis 150. The primary optical reflector 122 may be disposed in a location such that the primary optical reflector 122 is aligned with the opening. In some embodiments, the primary optical reflector 122 is disposed in a housing that includes a beam steering system 130 disposed on an optical deck 132. The beam steering system 130 may include an optical source and additional optical components (e.g., like the optical source system 210 and beam steering system 220 described with respect to FIGS. 2A-2C) configured to direct an optical signal through an opening in the primary optical reflector 122. The optical signal reflects off the secondary optical reflector 124, and then off the primary optical reflector 122 towards a communications recipient. The housing including the optical deck 132 and primary optical reflector 122 may be suspended on a vibration isolation device 134 disposed on the communications deck 136 such that the optical transmitter 120 is vibrationally isolated from the RF subsystem 110.

As shown, the secondary optical reflector 124 is disposed at a second location on the central axis 150 between the primary optical reflector 122 and the RF feed 114. The secondary optical reflector 124 may be transparent to RF radiation to minimize interference with RF signals transmitted by the RF feed 114. A set of struts 126 support the secondary optical reflector 124 (e.g., supporting arms may extend from the struts 126 and attach to external edges of the secondary optical reflector 124 to suspend the secondary optical reflector 124 in a desired position). The struts 126 are constructed of a material that is not transparent to RF radiation to facilitate the precise alignment of the secondary optical reflector 124.

Precise placement of the secondary optical reflector 124 ensures proper redirection of an optical beam (e.g., from the beam steering system 130) to a communications target. Since the secondary optical reflector 124 is disposed an axial distance from the primary optical reflector 122, environmental perturbations (e.g., vibrational and thermal loads placed on struts 126) may cause perturbations in the positioning of the secondary optical reflector 124. Due to the great distances over which the hybrid communications system 100 may be used to communicate information over, minor deviations in the secondary optical reflector 124's positions may cause the optical beam to completely miss its communications target. For instance, in the example shown, the hybrid communications system 100 may be disposed on an exploration craft (e.g., a rover or other exploration vehicle) that includes various rotating components (e.g., wheels). The rotation of such components via motors may cause vibrational energy to travel through the struts 126 at relatively high frequencies (e.g., 100 Hz). This vibrational energy may disturb the orientation of the secondary optical reflector 124 causing the optical beam to deviate from a desired communications target. The systems and methods described herein may be utilized to mitigate such high frequency disturbances in the secondary optical reflector 124's position, providing for more continuous communications between the hybrid communications system 100 and the intended recipient.

Figure 2A:
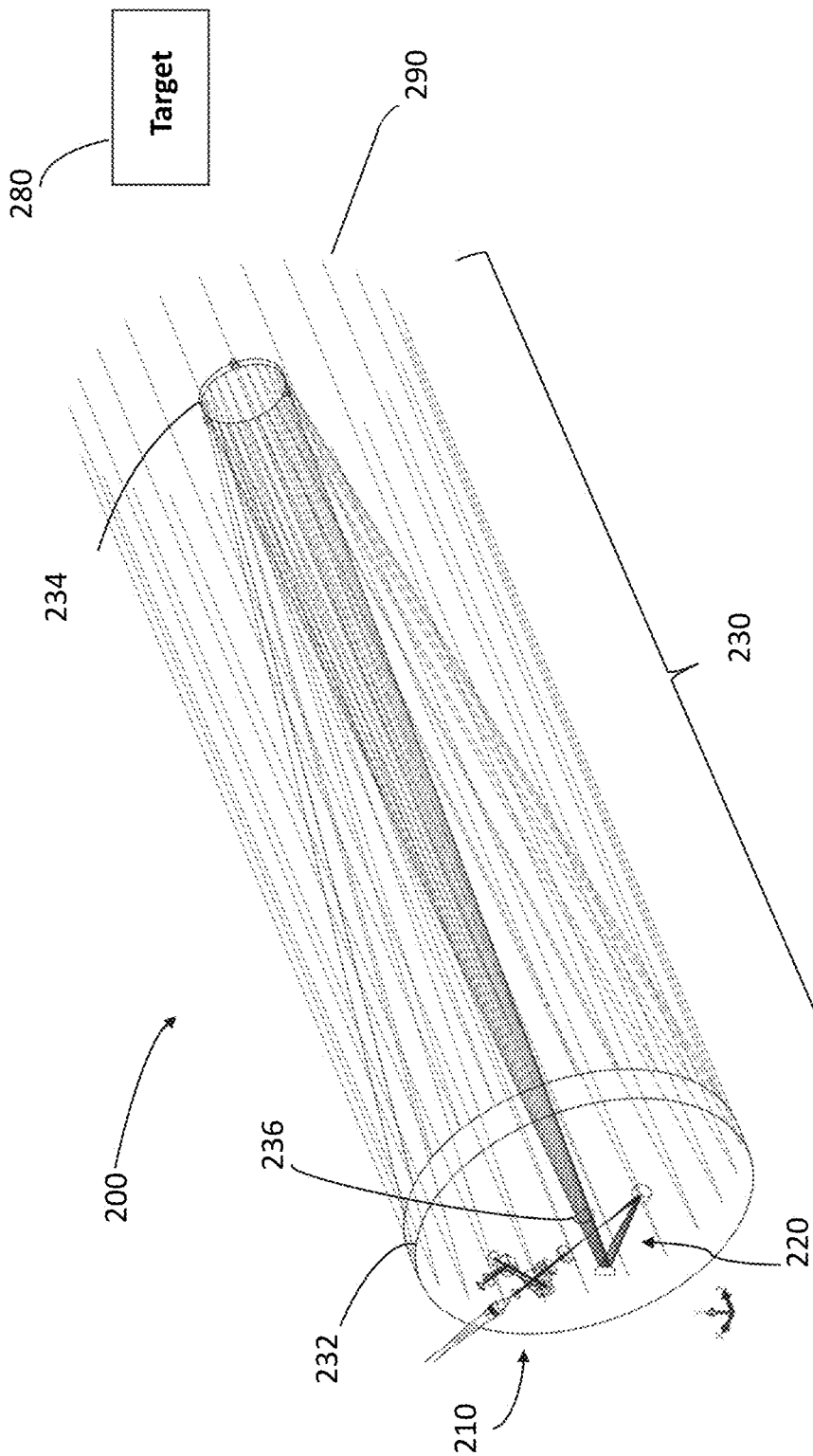
FIG. 2A is a perspective view of an optical transmission system, according to an example embodiment.

Referring now to FIG. 2A, an optical transmission system 200 is shown, according to an example embodiment. In the example shown, the optical transmission system 200 includes an optical source system 210, a beam steering system 220, and a beam expander 230. Generally, the beam steering system 220 is configured to direct an optical beam 290 generated via the optical source system 210 to the beam expander 230. In turn, the beam expander 230 is configured to expand the optical beam and direct the optical beam towards a target 280. The optical transmission system 200 may be used in a variety of different contexts. In certain embodiments, for example, the optical transmission system 200 is disposed on a spacecraft or other exploration vehicle (e.g., within a hybrid communications system like that described with respect to FIG. 1), and the target 280 may comprise an optical receiver of a desired recipient (e.g., on Earth or another spacecraft).

In the example shown, the beam expander 230 is a reflective beam expander having a Casegrain geometry. As such, the beam expander 230 includes a primary optical reflector 232 and a secondary optical reflector 234. The primary optical reflector 232 is a concave mirror having an opening 236 at the center thereof. Opening 236 provides a pathway for the optical beam 290 to propagate to the secondary optical reflector 234. In various embodiments, the opening 236 is centered within the primary optical reflector 232 and also aligned with a center of the secondary optical reflector 234. As shown, the optical beam 290 emerges from the opening 236 in a diverging state and reflects of the secondary reflector 234. Upon reflecting from the secondary optical reflector 234, the optical beam 290 is still in a diverging state. In various embodiments, the properties of various optical elements (e.g., the focal lengths and positioning of the primary and secondary optical reflectors 232 and 234, as well as other elements in the optical source system 210) are chosen such that, when the secondary optical reflector 234 is in a desired state of alignment, the optical beam 234 emerges from the beam expander 230 in an expanded, collimated state.

The relative orientation of the secondary optical reflector 234 with respect to the primary optical reflector 232 may change due to various disturbances in the mounting structure (such as the struts 126 described with respect to FIG. 1) used to suspend the secondary optical reflector 234 at an appropriate position. Given that the target 280 may be extremely distant from the optical transmission system 200, relatively small perturbations in the secondary optical reflector 234's position may severely disrupt the signal therefrom. Accordingly, the optical transmission system 200 includes an alignment controller configured to counteract these disturbances via adjustable components contained in the beam steering system 220.

In order to effectively counteract disturbances in the secondary optical reflector 234, accurate readings of the real-time pointing direction of the beam expander 230 are needed. Existing approaches fail to provide sufficient readings for continuous communications. For example, certain prior systems may utilize a wave front sensor (e.g., or Shack-Hartman Wave Front Sensor, or "SHWFS") to image the current field of view of a transmitter. The wave front error within this image may be used to provide an indication of a misaligned beam expander, for example. In the space communications context, the SHWFS may also be used as part of a star tracking system to gain a sense of the beam expander's alignment. However, such existing approaches are relatively slow and are only capable of detecting disturbances on the order of 5-10 Hz. In the space communications context, spacecraft actuators may cause disturbances of 100 Hz or greater on the secondary optical reflector 234.

To correct for such high-speed disturbances, the systems and methods described herein utilize an alternative approach. Rather than relying on light originating from a source external to the transmission system 200 (as the previous approaches discussed herein do), the present disclosure relies on back reflections of the optical beam 290 via specially crafted reflecting portions of the secondary optical reflector 234.

Figure 2B:
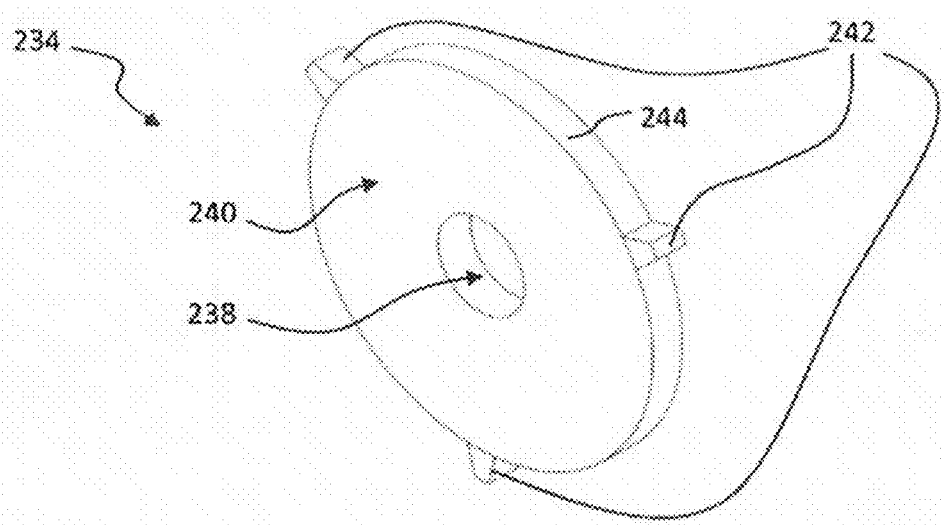
FIG. 2B is a perspective view of an optical element of the transmission system shown in FIG. 2A, according to an example embodiment.

Referring now to FIG. 2B, a perspective view of the secondary optical reflector 234 described with respect to FIG. 2A is shown, according to an example embodiment. As shown, the secondary optical reflector 234 includes a central portion 238, a main portion 240, and reflecting portions 242. In various embodiments, the main portion 240 is a convex mirror having a curved surface that extends from an outer circumferential edge 244 of the main portion 240 to the central portion 238. Such a convex mirror may have a substantially flat spot in its center. This flat spot may reflect the optical beam 290 back upon itself, resulting in degraded performance. Accordingly, in various embodiments, the central portion 238 is opaque, or not reflective. In the example shown, the central portion 238 (an area in the center of the secondary optical reflector 234 that includes any flat spot) is an opening. In various alternative embodiments, a material configured absorb light at the frequency of the optical beam 290 is coated onto the central portion 238 to render it opaque. It should be appreciated that, in certain implementations, the central portion 238 may not be rendered opaque if the previously described back reflections can be eliminated.

The reflecting portions 242 extend radially outward from the outer circumferential edge 244. In various embodiments, the reflecting portions 242 comprise reflective flats that are disposed such their surfaces are perpendicular to a desired propagation direction of the optical beam 290 upon the optical beam reflecting off of the primary optical reflector 232. In other words, the reflecting portions 242 possess essentially undefined radii of curvature, in contrast to the main portion 240. As shown, the secondary optical reflector 234 includes three reflecting portions 242 equally distributed throughout the outer circumferential edge 244. Other numbers and distributions of reflecting portions may be used consistent with the present disclosure. The shown reflecting portions 244 possess planar surfaces oriented perpendicular to a desired propagation direction of the optical beam 290.

In the example shown, the reflecting portions 242 are trapezoidal-shaped, and possess widths at apexes thereof that are roughly half of the widths at the base. Such a configuration is beneficial in that it reduces the amount of the optical beam 290 blocked by the reflecting portions 242 in areas radially distant from the outer circumferential edge 244.

In various embodiments, the secondary optical reflector 234 is constructed via single point diamond turning ("SPDT"). In this process, a computer numerical controlled ("CNC") lathe includes a diamond piece possessing a surface adapted produce a desired surface (e.g., the flat reflecting portions 242) when applied to an optical workpiece. SPDT possess the precision necessary to produce reflecting portions 242 having the flatness required for the optical feedback schemes described herein. While SPDT is the preferred fabrication method for the secondary optical reflector 234, it should be understood that other fabrications may be used consistent with the present disclosure.

Figure 2C:
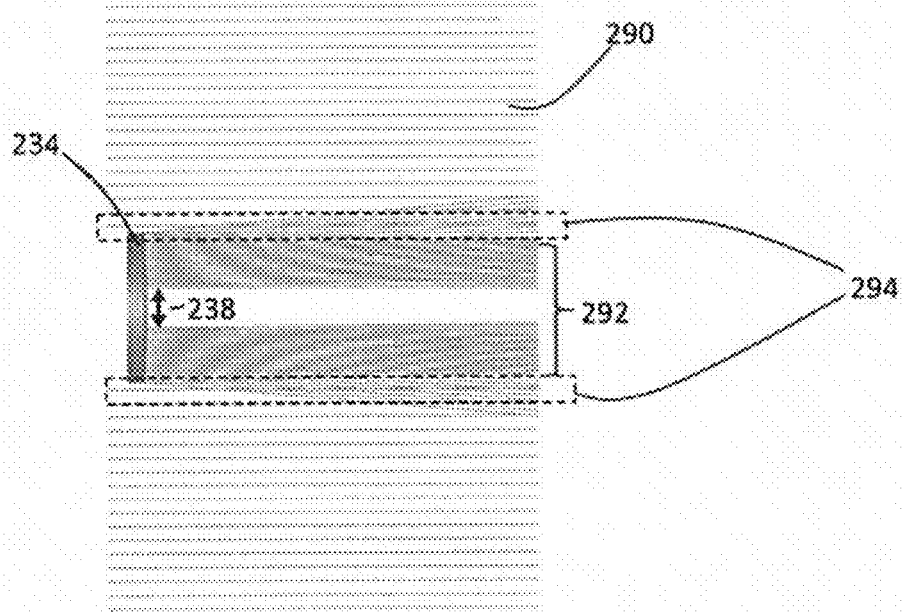
FIG. 2C is a diagram depicting a propagation path of an optical beam within the optical transmission system shown in FIG. 2A, according to an example embodiment.

Reflecting portions 242 are machined to possess precise flatness due to the operating principles of the alignment procedure described herein. In various embodiments, the secondary optical reflector 234 possesses a dimension (e.g., a diameter of the main portion 240 plus the height of the reflecting portions 242) that is greater than a diameter of the opening 236 in the primary optical reflector 232. As shown in FIG. 2C, the optical beam 290 possess a communications portion 292 and an alignment portion 294. The alignment portion 294 constitutes the portion of the optical beam 290 that reflects off the reflecting portions 242 after reflecting off the main portion 240 and the primary optical reflector 292. In a case where the primary and secondary optical reflectors 232 and 234 are aligned in a desired state, the optical beam 290 is collimated after reflecting off the primary optical reflector 232. In such a case, the alignment portion 294 propagates perpendicular to the planar surfaces of the reflecting portions 242, and therefore reflects in substantially the same direction back towards the primary optical reflector 232. In turn, the primary optical reflector 232 focuses the alignment portion 294 back towards the secondary optical reflector 234, which re-directs the focused alignment portion 294 (or a portion thereof) back through the opening 236 to the beam steering system 220 and a detector.

As described herein, when the primary and secondary optical reflectors 232 and 234 are aligned in a desired state, the alignment portion 294 is directed to a baseline position on the detector. When the secondary optical reflector 234 is disturbed from this desired state, the primary optical reflector 232 will not collimate the optical beam 290, resulting in the alignment portion 294 not being precisely back-reflected off of the reflecting portions 242. Such deviations result in the alignment portion 294 being directed to positions on the detector that deviate from the baseline position. As such, the reflecting portions 242, by introducing the alignment portion 294 into the system, create an ability to monitor the state of alignment between the primary and secondary optical reflectors 232 and 234 in real time.

Figure 3:
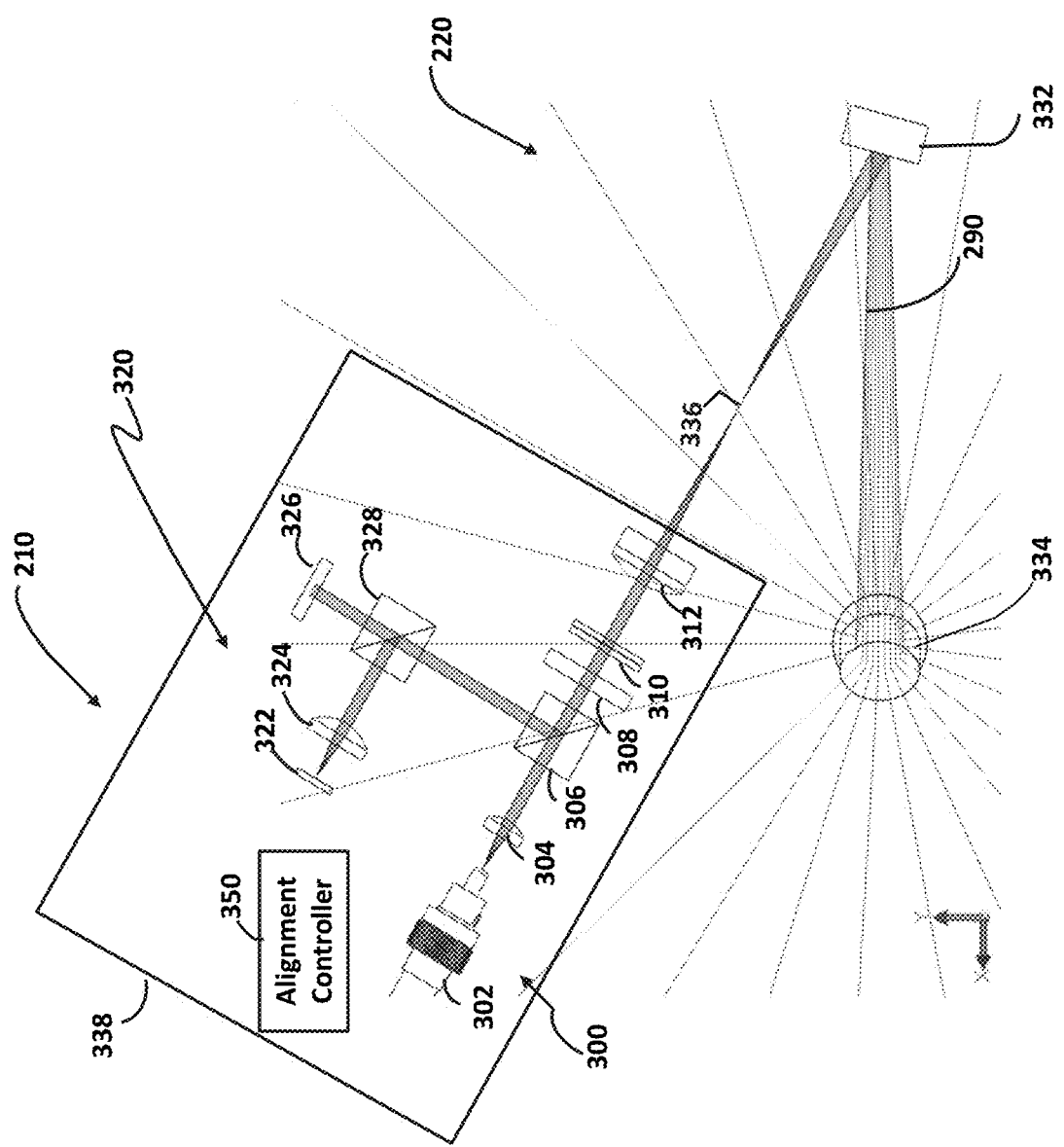
FIG. 3 is a schematic diagram of an optical source system and a beam steering system, according to an example embodiment.

Referring now to FIG. 3, a schematic diagram providing a more detailed view of the optical source system 210 and beam steering system 220 described in FIG. 2A is shown, according to an example embodiment. As shown, the beam steering system 220 includes a first adjustable optical element 332 and a second adjustable optical element 334 configured to direct the optical beam 290 generated via an optical source 302 through the opening 236. The first and second adjustable optical elements 332 and 334 may comprise fast steering optical components (e.g., galvanometric scanners) capable of changing positions at a relatively high frequency (e.g., 500 Hz). In some embodiments, the first adjustable optical element 332 is adjustable with respect to a first direction (e.g., the x-direction shown in FIG. 3) and the second adjustable optical element 332 is adjustable with respect to a second direction (e.g., the y-direction shown in FIG. 3) such that the course of the optical beam 290 is adaptable depending on the alignment of the secondary optical reflector 234. The first and second adjustable optical elements 332 and 334 include associated controller/actuator combinations (not depicted) that are communicably coupled to an alignment controller 350. As described herein, the alignment controller 350 is configured to generate feedback signals based on the alignment portion 294 of the optical beam that is directed to the detector 322. It should be appreciated that alternatives to the first and second adjustable optical elements 332 and 334 are envisioned. Any known beam set of beam steering components may be used consistent with the present disclosure (e.g., a multi-axis mirror, a fiber positioner, a prism-based transmissive system, etc.).

As shown, the optical source system 210 includes a source branch 300 and a detection branch 320. Source branch 300 includes an optical source 302, a collimating lens 304, a polarizing beam splitter 306, a mechanical shutter 308, a quarter waveplate 310, and a focusing lens 312. The optical source 302 is a fiber laser configured to emit light at a specified wavelength (e.g., 1550 nm). In some embodiments, the optical source 302 is configured to emit linearly polarized light along the fiber's slow axis. The fiber's slow axis may be coincident with the tertiary optical plane (e.g., a plain perpendicular to an optical axis of the beam expander 230) such that the optical source 302 emits p-polarized light. The collimating lens 304 is configured to collimate the polarized irradiance emitting from the optical source 302 to generate the optical beam 290. The polarizing beam splitter 306 is substantially transmissive to the p-polarized light (e.g., greater than 90%). Mechanical shutter 308 is configured to block the optical beam 290 in response to various inputs (e.g., a user providing an input, environmental detections, alignment detections, etc.), and may be placed at any point between the optical source 302 and the beam steering system 220.

The quarter waveplate 310 possesses a fast axis that is positioned at a 45-degree angle with respect to the tertiary optical plane such that the p-polarized light emitted via the optical source 302 is converted into circularly polarized light. In the example shown, the focusing lens 312 is a positive lens (or combination of lenses) configured to focus the optical beam 290 to a beam waist 336 at a desired position. It should be appreciated that certain implementations do not include a positive focusing lens 312. The focusing lens 312 may be replaced by different optics placed at different locations. For example, in certain implementations, focusing lens 312 may be replaced by a negative lens disposed after an imaginary focal point to produce diverging light prior to the beem steering system 220.

As shown, the beam steering system 220 is positioned after the beam waist 336 such that the optical beam 290 diverges as it propagates through the beam steering system 220 and the beam expander 230. The focal length of the focusing lens 312 may be matched with a focal length of the beam expander 230 to produce the collimated light towards the target 280. It should be appreciated that alternative sets of components for the optical source system 210 are envisioned. For example, some alternative embodiments may not rely on the polarization of the optical source 302 and instead rely on a detection path for the alignment portion 294 that does not spatially overlap with the propagation path of the optical beam 290 as it emerges from the optical source system 210. Such embodiments may not include the polarizing beam splitter 306 and quarter waveplate 310. Moreover, alternative light sources not requiring the use of collimating lens 304 may be used.

As described herein, the alignment portion 294 of the optical beam 290 is directed via the primary and secondary optical reflectors 232 and 234 back to the beam steering system 220. Since the optical beam 290 is circularly polarized as it emerges from the beam steering system 220, the alignment portion 294 will also be circularly polarized. In various embodiments, the beam steering system 220 directs the circularly polarized alignment portion 294 back through the focusing lens 312 and quarter waveplate 310, which shifts the polarization of the alignment portion 294 such that it possesses an s-polarization. The polarizing beam splitter 306 is configured to be reflective to s-polarized light, and therefore directs the alignment portion to the detection branch 320.

The detection branch 320 is shown to include a detector 322, a focusing lens 324, a wave front detector 326, and a polarizing beam splitter 328. In the example shown, the polarizing beam splitter 328 is configured to reflect s-polarized light, and therefore configured to guide the alignment portion 294 towards the detector 322. Focusing lens 324 is configured to focus the alignment portion 294 onto the detector 322, which in turn is configured to generate an alignment signal based on the focused alignment portion 294 incident thereon. In various embodiments, the detector 322 is a pixelated array (e.g., a CCD or CMOS detector) or position-sensing detector (e.g., a quad-cell detector). In certain embodiments, the detector 322 is configured to generate plurality of signals having values that vary in accordance with the intensity of the alignment portion 294 at various positions on the detector 322. The detector 322 (or alignment controller 322) may perform calculations on digitized versions of these signals to quantify various aspects (e.g., size, relative location, etc.) of the focused alignment portion 294. As described herein, these quantified aspects may be used by the alignment controller 350 to generate control signals for the adjustable optical elements of the beam steering system 220 to counteract fluctuations in the alignment of the secondary optical reflector 234. In certain embodiments, a neutral density filter is disposed between the polarizing beam splitter 328 and the detector 322 to provide intensity attenuation to avoid detector saturation.

The example embodiment shown includes a wave front detector 326. Some embodiments may not include the wave front detector 326 and the polarizing beam splitter 328. The wave front detector 326 (e.g., a SHWFS) is configured to monitor wave front distortion of incoming starlight radiation. A portion of the starlight possess a polarization that is transmitted via the polarizing beam splitter 328 onto the wave front detector 236. The wave front error present in the starlight may be used as a further input to generate alignment signals for the beam steering system 220 (e.g., during situations where the optical source 302 is turned off). In certain embodiments, another portion of the starlight is reflected via the polarizing beam splitter 328 and focused onto detector 322. Starlight signals generated via detector 322 may be used to calibrate an interferometric star tracker (not depicted) included on the spacecraft.

As shown, the entirety of the optical source system 210 is disposed on a translatable optical stage 338. The translatable optical stage 338 may be coupled to an actuator (not depicted) so as to render the positioning of the various components disposed thereon adjustable with respect to the beam steering system 220 in a direction parallel to the propagation of the optical beam 290. As described herein, the positioning of the translatable optical stage 338 may be adjusted to relocate the beam waist 336 responsive to measurements of the geometric size of the alignment signal. It should be appreciated that various subsets of the optical source system 210 (e.g., just the optical source 302 or just the focusing lens 312) may be disposed on the translatable optical stage 338 consistent with the present disclosure.

Figure 4:
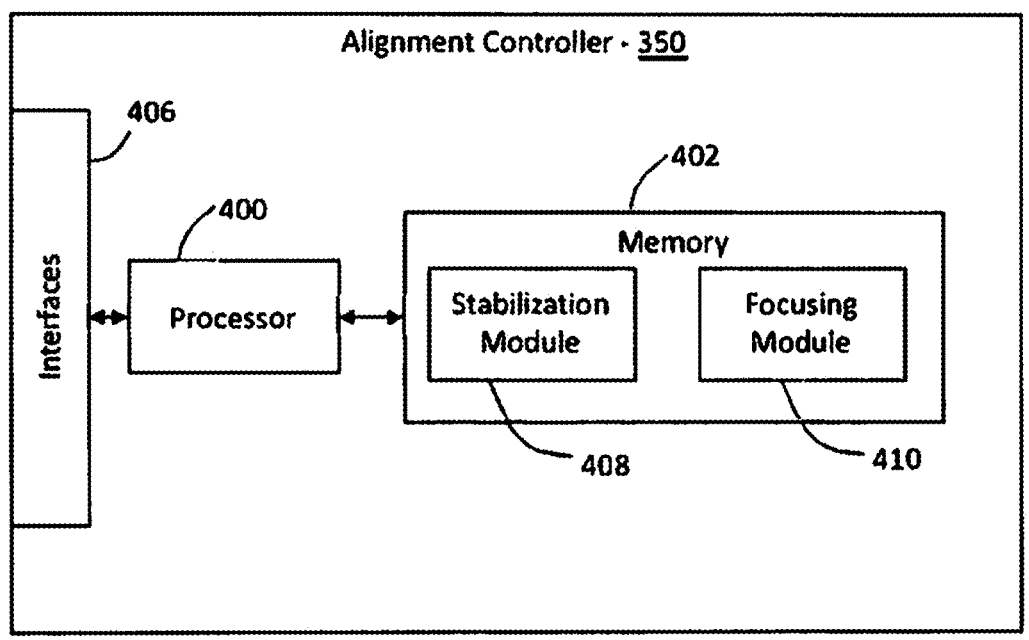
FIG. 4 is a block diagram of an alignment controller associated with an optical transmission system, according to an example embodiment.

Turning now to FIG. 4, a block diagram of the alignment controller 350 depicted in FIG. 3 is shown, according to an example embodiment. As shown, the alignment controller 350 includes a processor 400, a memory 402, and interfaces 406. Interfaces 406 generally allow the alignment controller 350 to communicate with the detector 322 and the adjustable optical components of the beam steering system 220. Communication with such components may be accomplished through any wired or wireless protocol. Accordingly, interfaces 406 may include physical ports and any additional components (e.g., analogue-to-digital converters, amplifiers, etc.) necessary to convert outgoing/incoming signals to a suitable form for processing via the processor 400. Via the interfaces 406, the alignment controller 350 receives the alignment signal from the detector 322 and transmits control signals to the beam steering system 220 to control the alignment of the optical beam 290.

The processor 400 may be a general or specific purpose processor, an application specific integrated circuit ("ASIC"), one or more field programmable gate arrays ("FPGA"), a group of processing components, or any other known processor architecture. Processor 400 may include an instruction bus and be communicably coupled to the memory 402, which may store instructions executable via the processor 400 to perform the various operations described herein. Memory 402 may include one or more data storage devices configured to store data, executable instructions, or any other form of information. Memory 402 may include random access memory, read only memory ("ROM"), hard drive storage, non-volatile memory, optical memory, or any other suitable memory for storing data and executable instructions. Memory 402 may also include database and object code components, script components, or any other type of information structure suitable performance of the various operations described herein.

Memory 402 is shown to include a stabilization module 408 and a focusing module 410. It should be appreciated that memory 402 may include any number of modules consistent with the present disclosure, and the shown example is not meant to be limiting. Moreover, in certain embodiments, separate memory devices store separate modules for performance of any of the operations described herein. Additionally, any number of controllers in communication with one another may be used to perform any of the operations described herein.

The stabilization module 408 is configured to generate control signals for the beam steering system 220 based on the alignment signal generated via the detector 322. In various embodiments, the alignment signal includes a plurality of intensity values corresponding to various intensities of the alignment portion 294. From these intensity values and location information thereof, the stabilization module 406 may cause the processor 400 to compute and store a centroid position of the alignment signal via any known method. This centroid position may be compared to a baseline value. The baseline value may correspond to a centroid position of the alignment portion 294 when the primary and secondary optical reflectors 232 and 234 are known to be in proper alignment. For example, the baseline value may be determined via an initial alignment of the beam expander 230 via a laser collimator. Based on a difference between a measured centroid position and the baseline value, the stabilization module 406 may include instructions configured to cause the processor 400 to generate a feedback signal containing a feedback value and send that signal to the adjustable optical elements of the beam steering system 220. The feedback values may cause actuators associated with the adjustable optical elements to re-orient the elements to counteract the difference between the centroid location and the baseline value. In various embodiments, the alignment controller 350 and detector 322 are capable of generating feedback signals at a rate of 100 Hz or more, providing the system the capability of counteracting relatively high frequency disturbances in the alignment of the secondary optical reflector 334.

The focusing module 410 includes instructions configured to generate a focusing signal based on a measured size of the alignment signal. For example, in some embodiments, the focusing module 410 includes a point spread function (PSF) instruction configured to cause the processor 400 to compute a size of the alignment signal (e.g., an area alignment portion 294 possesses a predetermined intensity) and compare that size to a baseline size. The baseline size may correspond to a premeasured value where the optical source system 210 and the beam expander 230 are in proper alignment. Based on a difference between the measured value, the focusing module 410 may cause the processor 400 to generate a focusing signal to cause the translation stage 338 to alter the position of the beam waist 336 to drive the alignment signal towards the baseline value. This way, the alignment controller 350 is configured to correct for both alignment and focusing errors arising from misalignment between the various components contained in the optical transmission system 200.

Figure 5:
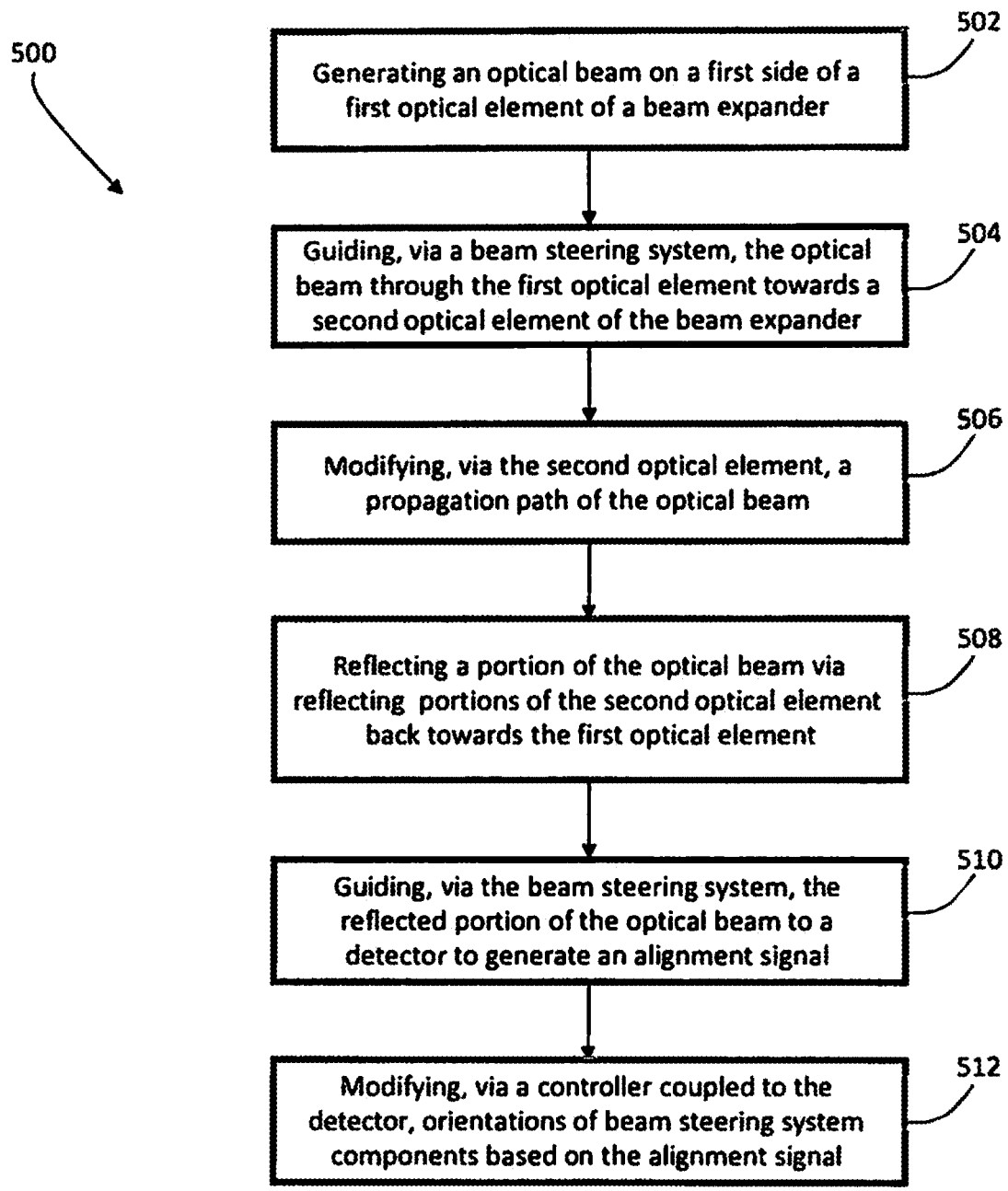
FIG. 5 is a flow diagram of a method of adjusting a beam steering system to mitigate disturbances to an optical element of a beam expander, according to an example embodiment.

Referring now to FIG. 5, a flow diagram of a method 500 of adjusting a beam steering system to mitigate disturbances to an optical element of an optical transmission system is shown, according to an example embodiment. Method 500 may be performed via the optical transmission system 200 described with respect to FIGS. 2A-4 of the present disclosure to mitigate low and high frequency disturbances to the secondary optical reflector 234 and provide substantially continuous communications to the target 280.

In an operation 402, an optical beam is generated on a first side of a first optical element of a beam expander. The beam expander may be a transmissive beam expander or a reflective beam expander. For example, the beam expander 230 described herein is a reflective beam expander and the first optical element is the primary optical reflector 232. In an operation 504, the optical beam is guided via a beam steering system through the first optical element towards a second optical element of the beam expander. The manner that the optical beam propagates through the first optical element will vary depending on the implementation. For example, in the optical transmission system 200 described herein, the optical beam 290 is guided via the beam steering system 220 through an opening 336 in the primary optical reflector 332. In alternative embodiments, the optical beam may be guided via any adjustable beam steering system through a central (or non-central) region of a primary lens of a transmissive beam expander. In certain embodiments, the optical beam may even be guided around the first optical element via the beam steering system.

In an operation 506, a propagation path of the optical beam is modified via a second optical element of the beam expander. In addition to the first optical element, the beam expander includes at least one additional optical element disposed further from the optical source than the first optical element. The identity and configuration of the second optical element varies depending on the implementation. In the optical transmission system 200 described herein, the second optical element is a secondary optical reflector 234. In alternative embodiments, the second optical element may include an additional lens or other component disposed downstream of the first optical element. The optical beam is reflected and/or refracted via the second optical element to situate the optical beam for collimation and direction towards a communications target.

In an operation 508, an alignment portion of the optical beam is reflected via reflecting portions of the second optical element back towards the first optical element. As described herein, the second optical element is generally a curved optical component configured to redirect a diverging optical beam. The second optical element has flats machined into it (e.g., via SPDT) that deviate from its general curvature. The flats may either be constructed of the same material (or possess the same finish) as the remainder of the second optical element (e.g., in certain cases where the second optical element is a mirror) or be different from the remainder of the second optical element. For example, in the case where the second optical element is a lens, the flats may be coated with a reflective (e.g., chrome) coating that deviates from the finish of the remainder of the second optical element. These flats may extend from an outer circumferential edge of the second optical element such that only outer portions of the beam are reflected via the flats (as described with respect to the secondary optical element 234). Alternatively, the flats may be disposed at various locations within a main body of the second optical element so that more central portions of the optical beam are back reflected.

In an operation 510, the alignment portion is guided via the beam steering system to a detector to generate an alignment signal. The alignment portion may be guided based on various means depending on the configuration. For example, in certain embodiments, the alignment portion is guided through polarization optics (e.g., a quarter waveplate), and reflected via a polarizing beam splitter to a detection branch including the detector. In alternative embodiments, mirrors may be disposed on optical paths that are offset from the main propagation path of the optical beam such that the alignment portion is only directed to the detector when the second optical element is misaligned in a certain manner. In such cases, multiple detectors may be disposed along multiple detection paths to receive the alignment portion when the second optical element is displaced in various different directions.

In an operation 512, orientations of beam steering system components are adjusted based on the alignment signal. As described herein, the beam steering system may include any number of adjustable components. Each adjustable component may include a corresponding actuator configured to change the orientation/position of the adjustable component based on control signals. In various embodiments, the optical transmission system includes an alignment controller configured to generate such control signals (or generate feedback signals that are sent to independent component controllers) based on the alignment signal generated via the detector(s). As described herein, in response to a centroid of the alignment signal deviating from a baseline value, the alignment controller may generate a plurality of control signals (e.g., one for each directional component of the misalignment of the centroid) and send those control signals to appropriate adjustable components of the beam steering system to counteract the misalignment. The controller may be configured to generate such signals at a frequency of greater than 100 Hz, thereby enabling the system to counteract high frequency directional disturbances (e.g., from thermal/vibrational loads) to components of the beam expander. This way, the beam expander is consistently pointed in a desired direction and efficient optical communications between the transmitter and a desired target is ensured. It should be appreciated that, in certain implementations, the beem steering system may be configured to intentionally point the optical beam off the main main axis of the system. This off-axis configuration may be used to point the optical system at an off-axis target. The off-axis target may provide an off-centered baseline position for alignment purposes.

It will be readily understood that the components of various embodiments, as generally described and illustrated in the figures herein, may be arranged and designed in a wide variety of different configurations. Thus, the detailed description of the embodiments of the present invention, as represented in the attached figures, is not intended to limit the scope of the invention as claimed but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that embodiments of the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. An Optical Transmitter comprising:
   a beam steering system configured to direct an optical beam through a first optical element towards a second optical element, wherein the second optical element is susceptible to thermal and vibrational loads that disrupt an alignment between the first and second optical elements, wherein the second optical element comprises:
      a main portion configured to direct the optical beam down a propagation path including a communications target; and
      a reflecting portion configured to direct an alignment portion of the optical beam back to the beam steering system through the first optical element;
   a detector configured to receive the alignment portion and generate an alignment signal; and
   a controller configured to adjust the adjustable optical element based on the alignment signal to counteract the loads;
   wherein the first and second optical elements form a reflective beam expander;
   wherein the first optical element comprises a primary optical reflector having an opening therein centered about an optical axis, wherein the beam steering system is configured to guide the optical beam through the opening towards the second optical element, wherein the second optical element is a secondary optical reflector configured to reflect the optical beam back towards the primary optical reflector;

wherein the main portion is a convex mirror comprising a curved portion extending between the optical axis and a circumferential edge of the main portion, wherein the curved portion is configured to direct the optical beam towards the primary optical reflector, wherein the reflecting portion extends radially outward from the circumferential edge such that the reflecting portion reflects the alignment portion after the optical beam is incident on the primary optical reflector; and wherein the secondary optical reflector comprises a central portion disposed on the optical axis that is not reflective.

2. The optical transmitter of claim 1, wherein the secondary optical reflector comprises a plurality of reflecting portions configured to direct a plurality of alignment portions of the optical beam back towards the primary optical reflector.

3. The optical transmitter of claim 1, wherein the beam steering system is configured to direct the optical beam in a diverging state towards the second optical element.

4. The optical transmitter of claim 1, further comprising an optical source configured to generate the optical beam, wherein the optical source is configured to emit linearly polarized light, wherein the optical transmitter further comprises:
 a polarizing beam splitter disposed between the optical source and the beam steering system on an optical axis, the polarizing beam splitter being configured to allow the linearly polarized light to pass therethrough; and
 a focusing lens disposed between the polarizing beam splitter and the beam steering system, the focusing lens configured to generate a beam waist at a focal point of the focusing lens, wherein focal point is situated such that, when the second optical element is aligned in a first state, the optical beam is collimated upon the optical beam being emitted from the optical transmitter.

5. The optical transmitter of claim 4, wherein, in response to the thermal and mechanical loads, the second optical element is configured to deviate from the first state and cause the alignment portion to traverse the first optical element and be incident on the polarizing beam splitter in a polarization-shifted state such that polarizing beam splitter reflects the alignment portion towards the detector.

6. The optical transmitter of claim 5, wherein the apparatus further comprises a quarter waveplate positioned at a 45-degree angle with respect to the linearly polarized light such that the optical beam is circularly polarized upon being incident on the beam steering system.

7. The optical transmitter of claim 4, further comprising an additional focusing lens disposed between the polarizing beam splitter and the detector, wherein the detector is positioned at a focal point of the additional focusing lens.

8. The optical transmitter of claim 1, wherein the controller is configured to adjust an additional adjustable optical element of the beam steering system based on the alignment signal.

9. The optical transmitter of claim 8, wherein the controller is configured to generate stabilizing signals for adjusting the adjustable optical elements in response to the alignment signal possessing a centroid location that deviates from a baseline location by more than a first threshold.

10. The optical transmitter of claim 9, wherein the detector is configured to calculate a size associated with the alignment portion of the optical beam incident on the detector, and wherein the controller is configured to adjust a focusing position of the optical beam prior to the optical beam reaching the first optical element in response to the size of the alignment signal calculated by the detector being above a second threshold.

11. An apparatus comprising:
 an optical source configured to generate an optical beam that propagates down an optical axis;
 a beam steering system configured to guide the optical beam to a beam expander disposed on the optical axis, wherein the beam expander is configured to collimate the optical beam and project the optical beam towards a target, wherein the beam expander comprises:
 a first optical element, wherein the first optical element comprises a primary optical reflector having an opening therein centered about an optical axis; and
 a second optical element disposed further from the optical source than the first optical element such that the beam steering system is configured to guide the optical beam through the opening of the first optical element towards the second optical element,
  wherein the second optical element includes a main portion and a reflecting portion,
  wherein the main portion is a convex mirror comprising a curved portion extending between the optical axis and a circumferential edge of the main portion, wherein the curved portion is configured to direct the optical beam towards the primary optical reflector, and the reflecting portion extends radially outward from the circumferential edge and is configured to direct an alignment portion of the optical beam back through the first optical element after the optical beam is incident on the primary optical reflector to the beam steering optical system, and
  wherein the secondary optical reflector comprises a central portion disposed on the optical axis that is not reflective;
 a detector configured to receive the alignment portion and generate an alignment signal; and
 a controller configured to manipulate an orientation of a first component of the beam steering system based on the alignment signal to counteract thermal and vibrational disturbances on the second optical element.

12. The apparatus of claim 11, wherein the controller comprises a stabilization module configured to cause the controller to generate an alignment controller signal for the first component to change the orientation based on a measured location of the alignment signal on the detector.

13. The apparatus of claim 12, wherein the detector is configured to calculate a size associated with the alignment portion of the optical beam incident on the detector, and wherein the controller comprises a focusing module configured to cause the controller to alter a location of a focusing point of the optical beam based on the calculated size of the alignment signal on the detector.

14. The apparatus of claim 11, wherein the first optical element comprises a primary optical reflector having an opening therein centered about the optical axis,
 wherein the beam steering system is configured to guide the optical beam through the opening towards the second optical element,
 wherein the second optical element is a secondary optical reflector configured to reflect the optical beam back towards the primary optical reflector,
 wherein the secondary optical reflector comprises a main portion and the reflecting portion,
 wherein the main portion is a convex mirror comprising a curved portion extending between the optical axis and a circumferential edge of the main portion, wherein the curved portion is configured to direct the optical beam towards the primary optical reflector, wherein the reflecting portion extends radially outward from the circumferential edge such that the reflecting portion reflects the alignment portion after the optical beam is incident on the primary optical reflector.

15. A method comprising:

guiding, via a beam steering system, an optical beam through a first optical element of a beam expander towards a second optical element of the beam expander, wherein the secondary optical reflector comprises a central portion disposed on the optical axis that is not reflective;

modifying, via the second optical element, a propagation path of the optical beam;

reflecting, via a reflecting portion of the second optical element, an alignment portion of the optical beam back through the first optical element;

guiding, via the beam steering system, the alignment portion to a detector to generate an alignment signal; and controlling, via a controller communicably coupled to the detector, an adjustable element of the beam steering system based on the alignment signal.

16. The method of claim 15, wherein the controlling the adjustable element comprises:

generating, via the controller an alignment controller signal for the adjustable element to change an orientation of the adjustable element based on a measured location of the alignment signal on the detector;

calculating, by the detector, a size associated with the alignment signal incident on the detector; and generating, via the controller, a focusing signal configured to alter a location of a focusing point of the optical beam based on the calculated size of the alignment signal on the detector.

\* \* \* \* \*